United States Patent [19]

Campos

[11] Patent Number: 5,092,075

[45] Date of Patent: Mar. 3, 1992

[54] STORAGE DEVICE FOR USE IN EMERGENCIES OR AS A COMBINATION HAND CASTER INCLUDING FISHING REEL, TACKLE STORAGE BOX AND FLASHLIGHT STORAGE HANDLE

[76] Inventor: Jose M. Campos, 9179 Fontainbleau Blvd., Apt. 2, Miami, Fla. 33172

[21] Appl. No.: 658,867

[22] Filed: Feb. 22, 1991

[51] Int. Cl.$^5$ ............................................. A01K 97/00
[52] U.S. Cl. .................................. 43/54.1; 242/224; 242/96; 220/501; 206/315.11
[58] Field of Search ............... 43/54.1, 4, 18.1, 25.2; 206/315.11, 393, 391, 394, 409; 242/224, 323, 225, 96, 85.1; 220/501, 504, 524; 350/556

[56] References Cited

U.S. PATENT DOCUMENTS

| | | | |
|---|---|---|---|
| 730,972 | 6/1903 | Riglander et al. | 350/556 |
| 1,561,858 | 11/1925 | Jacob | 350/556 |
| 2,225,438 | 12/1940 | Sitek | 43/33 |
| 2,565,633 | 8/1951 | Scott | 43/33 |
| 2,579,087 | 12/1951 | Organ | 240/6.4 |
| 2,691,492 | 10/1954 | Lang | 242/96 |
| 2,791,676 | 5/1957 | Cote | 240/6.4 |
| 3,352,050 | 11/1967 | Mowrey | 43/54.1 |
| 3,364,610 | 1/1968 | Poole | 43/17 |
| 3,987,574 | 10/1976 | Pennino | 43/26 |
| 4,048,743 | 9/1977 | Lapinski | 43/17.5 |
| 4,650,297 | 3/1987 | Ishibai | 350/556 |
| 4,728,052 | 3/1988 | Yeh | 242/84.1 |
| 4,750,287 | 6/1988 | Myers | 43/17.5 |

*Primary Examiner*—Richard K. Seidel
*Assistant Examiner*—James Miner
*Attorney, Agent, or Firm*—Robert M. Schwartz; Edward I. Mates

[57] ABSTRACT

A storage device, preferably one sufficiently buoyant to float on water, comprises a hollow multiple compartment housing including a first compartment for storing emergency supplies or tackle, a second compartment for storing a spool containing a stored portion of a fishing line wound around said spool, an access opening to extend and wind an exterior portion of the line around a recessed wall portion of the housing that surrounds the second compartment without disturbing the portion of the line stored on the spool and a hollow third compartment having a light reflecting portion at its forward axial end. A handle for the multiple compartment housing comprises thin connecting means extending radially outwards from the multiple compartment housing to connect the latter with a hollow storage chamber that is located radially outward and axially rearward of the second compartment. The radially outward position of the handle provides a mechanical advantage to hold the device when a fish bites. The axial rearward position of the handle provides a mechanical advantage for casting the fishing line. The device is constructed and arranged to tilt upward in the forward direction to support the access opening above the water line when the box floats on water when the supplied and/or tackle and spool are stored in their respective compartments.

17 Claims, 1 Drawing Sheet

STORAGE DEVICE FOR USE IN EMERGENCIES OR AS A COMBINATION HAND CASTER INCLUDING FISHING REEL, TACKLE STORAGE BOX AND FLASHLIGHT STORAGE HANDLE

FIELD OF THE INVENTION

This invention relates to a storage device for use in emergencies or as a hand caster including a housing with a plurality of compartments including one for storing a box for emergency supplies and/or tackle, another for storing and feeding a fishing line and a storage chamber for an illuminating or light reflection device that also cooperates with a thin connecting member to serve as a handle for the housing.

DESCRIPTION OF THE PRIOR ART

The prior art contains many storage devices that assist a fisherman in his fishing exploits. Various combinations of storage devices have been used with fishing rods and/or fishing lights in the past.

U.S. Pat. No. 2,225,438 to Sitek discloses a container for tackle and weights that are secured circumferentially around a fishing rod by spring loaded attachments.

U.S. Pat. No. 2,565,633 to Scott discloses a fishing rod having a light carried by a hollow, battery storage handle for illuminating the fishing rod. The fishing rod also has a reel carried thereby that is rotatably mounted about an axis extending across the length of the rod.

U.S. Pat. No. 2,579,087 to Organ discloses another structure for a fishing rod containing a light attached to the rod. The rod has a recessed portion that movably supports a reel carrying a fishing line. A housing for the light moves between a recessed storage position and a reel-illuminating position.

U.S. Pat. No. 2,791,676 to Cote discloses a structure containing bores in a fishing rod handle to receive pencil flashlights for illuminating either a rod and reel or a fishing net.

U.S. Pat. No. 3,364,610 to Poole discloses a moving insulating member that adjusts a control for an actuating force needed to close a circuit that actuates a bite indicator light. A minimum force actuated by a fish bite is required to insure that a large enough fish has bitten the bait attached to the end of a line that actuates a switch for illuminating the light in response to a fish bite.

U.S. Pat. No. 3,987,574 to Pennino discloses a cylindrical container having a compartmented tray for fishing tackle and a plurality of axially aligned and peripherally spaced bifurcated hooks that engage a plurality of longitudinally directed fishing rod and reel assemblies angularly spaced about the circular periphery of the cylindrical container.

U.S. Pat. No. 4,408,743 to Lapinski discloses a hand caster for fishing having a rotatably frictionally tensioned casting head and a light emitting means with at least one battery disposed in its tubular handle. A reversible knife blade is disposed in the end of the handle opposite the light emitting means surrounded by a first, inner and second, outer casting head. A bayonet joint connects the outer, second casting head in coaxially operatively mounted position around the first casting head. The casting heads are translucent.

U.S. Pat. No. 4,728,052 to Yeh discloses a combined bait case and fishing reel. The bait case is pivotally connected to the fishing reel on the lower portion of the fishing reel to obtain ready access to fishing equipment such as bait, that is contained in the case.

U.S. Pat. No. 4,750,257 to Myers discloses an axially aligned handle for a fishing rod. The handle contains a storage compartment for an integral flashlight and on-/off switch, a storage compartment for hooks, sinkers and other fishing equipment that contains a removable cap, and a notched portion that receives a recessed cutting blade.

BRIEF DESCRIPTION OF THIS INVENTION

The present invention provides a storage device for use in emergencies or as a hand caster and includes a multi-compartment housing of essentially cylindrical configuration. A first housing compartment at one axial end portion of the housing is constructed and arranged to store tackle or emergency supplies such as a survival kit comprising flares and a first aid kit therewithin and has a screw cap at its axial rear end for ready access thereto and waterproof closure thereof. A second housing compartment axially aligned forward of the first housing compartment is constructed and arranged to store a rotatable spool of smaller diameter than said second housing compartment therewithin. The spool is inserted through said first housing compartment and into said second compartment through a clearance hole defined by a short circumferential wall that separates the first and second compartments. The outer wall of the second housing compartment is apertured with an access opening to receive an exterior portion of a fishing line that extends from a stored inner fishing line portion wound on the spool to an outer circumferential recess around said second housing compartment. The wall along the outer surface of the second housing compartment forms a recessed portion of the outer wall of the multi-compartment housing to receive the exterior portion of the fishing line wound around the recessed portion. A third housing compartment may be axially aligned with said first and second compartments and is hollow to improve the buoyancy of the housing. A hollow storage chamber is radially offset outwardly from the multi-compartment housing and is constructed and arranged to support an illuminating device (e.g. a flashlight) and also is axially aligned with the first housing compartment and connected thereto by a connector specially constructed and arranged to provide a handle readily gripped by the fingers and hand of a user such as an angler. At least one end wall of the multiple housing compartment may also be provided with a light reflecting portion for use in an emergency. When emptied, the first housing compartment may be used to bail water from a boat used for fishing.

The hollow storage chamber may have at least one transparent end wall at one end thereof for transmission of light from a stored flashlight through a selected transparent end wall. If both end walls are transparent, the stored flashlight within the flashlight storage chamber may be oriented in either of two opposite directions to provide light transmission through either end wall of the flashlight storage chamber. The connector extending radially outward from the outer wall of the first compartment of the multi-compartment housing interconnects the hollow storage chamber to the multi-compartment housing. The thin handle has concavely curved end surfaces and a radially inward extending member constructed and arranged to cooperate with said chamber to form a handle for easy gripping by a hand and fingers of the user such as the angler. The box is constructed and arranged to float in water with its hollow flashlight storage chamber and said access opening above a water line of the box. In this manner, if the angler is fishing in water, the light from the flashlight identifies his position above the surface of the water.

If the fisherman is fishing from a bridge where automobiles pass close by, light reflecting means at the front end of the third housing compartment and/or at the rear end of the first housing compartment provides adequate warning for an oncoming motorist of the presence of the angler along the bridge. The light reflecting means may also identify the position of the angler to an overhead observer when the flashlight is not operating.

None of the references of the prior art that were found during a prior art search suggest the use of a floating fishing box with a hollow support chamber having a transparent end wall with or without a light reflection portion or an access opening in a spool storage compartment above the water line at which the fishing box floats when loaded. None of said found references provide for storing a spool containing an inner stored portion of a fishing line within a spool storage compartment and an outer feeding portion wound around the outer wall of said spool storage compartment that can be fed without depleting the stored portion. None of said references offsets a flashlight storage compartment that also serves as a handle for the caster in radially outward and axially rearward relation to said outer extension portion of said fishing line to obtain a mechanical advantage for holding the line when a fish bites and for casting the outer extension portion of the line wound around said second compartment without disturbing the portion of the fishing line stored on said spool within said second compartment. These and other benefits of the invention will become evident as a result of a description of a preferred embodiment of this invention that follows.

BRIEF DESCRIPTION OF DRAWINGS

In the drawings that form part of a description of a preferred embodiment of this invention.

DESCRIPTION OF PREFERRED EMBODIMENT

Figure 2:
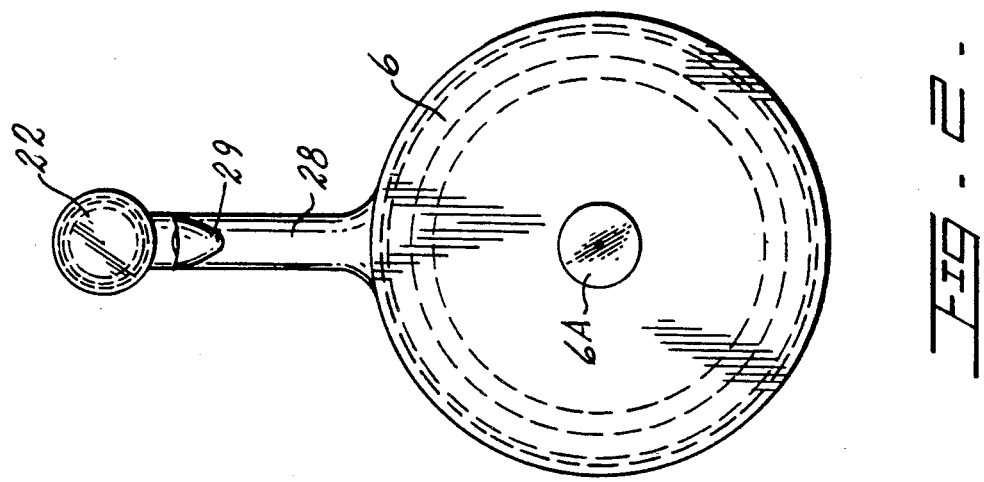
FIG. 2 is a head on view of the rear end of the device depicted in FIG. 1.
Figure 1:
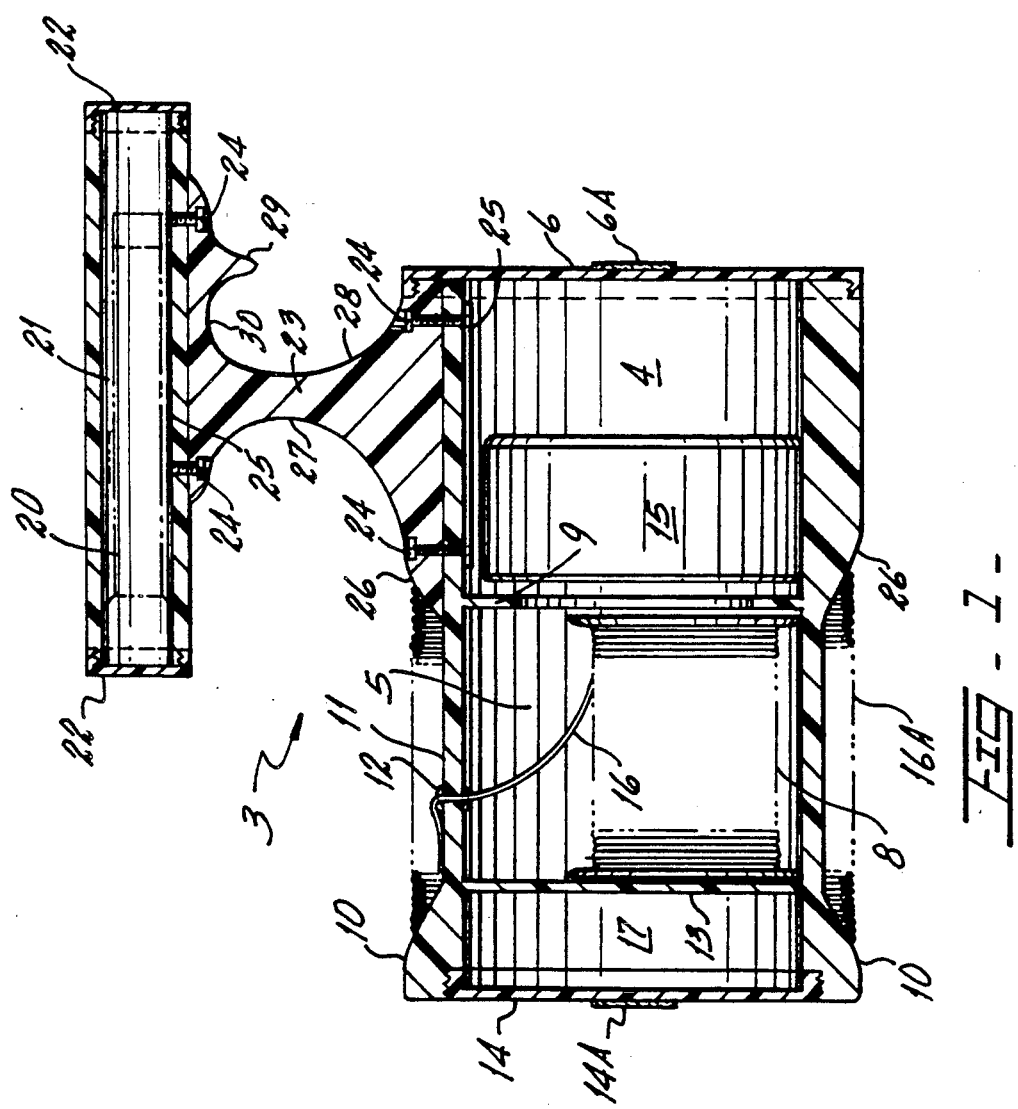
FIG. 1 is a longitudinal sectional view of a specially constructed multi-compartment box comprising a plurality of axially aligned compartments, a hollow storage chamber and a specially constructed thin connecting member forming a preferred embodiment of this invention.

Referring to the drawings, a storage device conforming to this invention comprises a multi-compartment housing 3 of essentially cylindrical configuration along an axis containing a plurality of axially aligned compartments. These include a first housing compartment 4 constructed and arranged to receive a storage box 15 for emergency supplies or tackle at the rear end of housing 3, a second housing compartment 5 axially forward of first compartment 4 for receiving a storage spool 8 whose diameter is less than that of second compartment 5, and a third compartment 17 of hollow construction to improve the buoyancy of housing 3. Third compartment 17 at the front end of housing 3 has an axially inner wall 13 of solid impervious structure that separates third compartment 17 from second compartment 5 and an impervious, axially outer front wall 14 optionally containing a light reflection portion such as a mirror 14A of a light reflection material. The first compartment 4 contains a screw cap 6 to provide access from the rear to insert spool 8 through first compartment 4 into second compartment 5 and the tackle box 15 within the first compartment 4. Screw cap 6 also has an axially back wall of light reflection material such as a small mirror 6A.

A short circumferential divider wall 9 extending radially inward from the outer wall of housing 3 separates the first compartment 4 from the second compartment 5 and also encloses a circular opening barely large enough for inserting spool 8 into second compartment 5 from first compartment 4. After its insertion into second compartment 5, spool 8 is released to fall on the bottom of second compartment 5 and divider wall 9 and wall 13 retain the spool 8 in free rotatable condition therebetween once inserted within second compartment 5.

Multi-compartment housing 3 has an outer wall 11 of essentially cylindrical configuration except for an enlarged front wall portion 10 that surrounds the hollow third compartment 17. An access opening 12 through a radially upper portion of outer wall 11 of second compartment 5 provides means for leading a fishing line 16 from an internal portion wound for storage around spool 8 within second compartment 5 to an exterior portion 16A of fishing line 16 wound around the outer surface of outer wall 11 of the multi-compartment housing 3 axially behind enlarged portion 10. Normally, 200 feet of fishing line 16 are wound around reel 8 within second housing compartment 5 and 100 feet of fishing line extension are wound around outer wall 11 of second compartment 5 at the start of a campaign. When the fishing line extension becomes worn, the worn part is removed by cutting and another length of fishing line 16 is pulled from reel 8 through access aperture 12 for winding about outer wall 11. When fishing line extension 16A is cast, the small diameter of access opening 12 insures that the portion of line 16 stored around spool 8 remains stored within second compartment 5. However, line 16 may be pulled manually from spool 8 through access aperture 12 to provide a replacement extension portion 16A around outer wall 11 when needed.

A flashlight 20 is stored within a hollow storage chamber 21 having transparent screw caps 22 at either end thereof so that a flashlight stored therewithin can illuminate in either direction through one or the other transparent screw caps 22 of the flashlight storage chamber 21. A thin connector 23 is connected with anchor screws 24 to a first base plate reinforcement 25 within flashlight storage chamber 21 and to an additional base plate reinforcement 25 within the first compartment 4. The thin connector 23 extends radially outward from a convexly shaped axially forward and radially inner portion 26 that fits around outer wall 11 of first housing chamber 4 of multi-compartment housing 3 in axially spaced relation behind enlarged portion 10, to form a circumferential recess axially behind enlarged portion 10. The circumferential recess surrounds the outer circumferential wall of second compartment 5. Connector 23 extends axially along the outer wall of the first compartment 4.

Thin connector 23 is specially shaped with a radially outwardly extending forward edge wall 27 and rear edge wall 28, both of concave configuration toward a radially inward extending member 29 via a concavely curved connecting axial portion 30 to receive the fingers of a person. The thin connector 23 cooperates with the flashlight storage chamber 21, which is a hollow structure radially offset outside the multi-compartment housing 3 to provide a handle 21, 23.

The exterior portion 16A of fishing line 16 is wound around the outside wall 11 of second compartment 5. Handle 21, 23 is offset radially outward and axially rearward of second compartment 5 so as to provide a mechanical advantage for casting exterior portion 16A axially forward without disturbing the portion of fishing line 16 stored on spool 8 within second compartment 5. This mechanical advantage is not obtained from casting apparatus whose handle is axially aligned with an exterior portion of a fishing line that is unwound when a fishing pole is cast.

The thickened portion 10 and the special shape of the lower portion 26 of thin connector 23 causes the outer surface of the wall 11 of the multi-compartment housing 3 in the vicinity of second compartment 5 to become a recessed circumferentially extending portion of the outer wall 11 of the multi-compartment housing 3 to receive windings of exterior portion 16A of the fishing line 16. Since the diameter of outer wall 11 is larger than that of spool 8 stored within second chamber 5, fewer turns are required to rewind exterior portion 16A around outer wall 11 between enlarged portion 10 and convexly shaped portion 26 than would be necessary to wind exterior portion 16A of line 16 about spool 8 when it becomes necessary to prepare the caster for another strike.

Having the portion of handle 21, 23 offset radially outwardly from the wound exterior portion 16A of fishing line 16 provides an angler with a mechanical advantage that enables the angler to control the fishing line more readily when a fish bites. Locating handle 21, 23 rearward of the windings of exterior portion 16A provides a mechanical advantage that facilitates casting of exterior portion 16A in a forward direction compared to the case where a line is cast from a fishing reel mounted along the length of a fishing pole.

The walls of multi-compartment housing 3 and hollow storage chamber 21 and thin connector 23 are preferably made of a rigid, water impermeable plastic of low density. When placed on water, housing 3 tilts upward toward its forward end as third compartment 17 is empty while first compartment 4 is weighted with box 15 and its contents and/or other supplies useful in an emergency and flashlight storage chamber 21 and connecting member 23 tilt the rear axial portion of housing 3 downward.

Thus, it is seen that the present invention provides a storage device that is capable of floating on water with its hollow storage chamber 21 above the surface of the water so as to be visible at night and not capable of being lost readily. The access aperture 12 for second compartment 5 is also above the water line of multi-compartment housing 3 to keep water from entering housing 3 and spoiling its buoyancy.

Spool 8 is stored in second compartment 5 by emptying first compartment 4 and unwinding a length of fishing line 16 from spool 8 and attaching the free end of line 16 to a needle. The latter is inserted through first compartment 4 and the opening within divider wall 9 to second compartment 5 and through access opening 12 leading a portion of fishing line 16 therebehind. Spool 8 is then inserted through first compartment 4 and into second compartment 5 and allowed to drop onto the bottom of the latter while a length of fishing line 16 is held outside access opening 12. A sufficient length 16A of line 16 is then wound around the circumferential recess of second compartment 5 after releasing the front end of line 16 from the needle.

The light reflector material of mirrors 6A and 14A of end walls 6 and 14 at the outer axial ends of compartments 4 and 17 give protection for a fisherman fishing from a narrow bridge or one stranded in a body of water and the combination of a reel 8 within second compartment 5 and the recessed portion of the wall surrounding second compartment 5 gives adequate storage space for an elongated line 16 inside and its exterior line portion 16A outside elongated multi-compartment housing 3.

Conforming to the provisions of the patent statutes, applicant has described and illustrated a preferred embodiment of his invention and also has provided a description of his invention in more general terms. It is understood that the invention may be practiced as recited in the claimed subject matter that follows rather than the exact replica of the preferred embodiment described herein without departing from the spirit of this invention.

What is claimed is:

1. A storage device comprising a multi-compartment housing of essentially cylindrical configuration having an axis, a first housing compartment at one axial end portion of said housing, said first housing compartment being constructed and arranged to store a box containing emergency supplies or tackle therewithin, a second housing compartment axially aligned with said first housing compartment, said second housing compartment being constructed and arranged to receive a rotatable spool therewithin with stored portion of a fishing line wound on said spool, and a third housing compartment that is hollow at the opposite axial end portion of said multi-compartment housing, a hollow storage chamber radially offset from said axis of said multi-compartment housing, thin connecting means extending radially outward from said first housing compartment to interconnect said hollow storage chamber to said first housing compartment of said multi-compartment housing, said device being constructed and arranged to float in water with its hollow storage chamber and connecting means above a water line of said housing, said hollow storage chamber being constructed and arranged to store a flashlight therewithin, and a transparent end wall for said hollow storage chamber to transmit light from a stored flashlight through said transparent end wall, wherein said second housing compartment has an outer circumferential wall with a circumferential recess and an access opening extending through said outer circumferential wall above said water line for passing an exterior portion of said fishing line therethrough from said fishing line portion stored around said rotatable spool within said second housing compartment, said circumferential recess being constructed and arranged for winding said exterior portion of said fishing line thereabout.

2. A storage device as in claim 1, wherein said outer wall of said multi-compartment housing has a thickened portion at a forward end surrounding said third compartment and said thin connecting means has a convexly curved forward portion spaced axially rearward of said thickened portion that forms a recessed exterior wall portion circumferentially surrounding said second housing compartment to receive a wound exterior portion of said fishing line extending from said stored portion on said spool beyond said access opening.

3. A storage device as in claim 2, wherein said thin connecting means has concavely curved forward and rear edges extending radially outward and leading to a radially inwardly extending member that cooperates with said hollow storage chamber to form a handle located radially outward and axially rearward of said spool to receive the fingers of an angler to facilitate hand holding of said fishing box by holding said radially offset hollow storage chamber axially rearwardly and radially outward of said recessed exterior wall portion, said axial rearward position providing a mechanical advantage for casting said exterior portion of said fishing line without affecting its stored portion on said storage spool and said radial outward position providing a mechanical advantage for said handle to hold said line more securely when a fish bites than when said handle is aligned with said spool.

4. A storage device as in claim 3, wherein said radially inwardly extending member forms an extension for a concavely curved axially rearwardly extending portion of said thin connecting means.

5. A storage device as in claim 1, further including a second transparent end wall for said hollow storage chamber opposite said previously mentioned transparent end wall to enable said flashlight to be oriented in either of two opposite axial directions to transmit light through a selected one or the other of said transparent end walls.

6. A storage device as in claim 1, further including an outer end wall for said third compartment having an axially outer surface portion composed of light reflecting material.

7. A storage device as in claim 1, wherein said transparent end wall has a light reflection portion.

8. A storage device as in claim 1, including a circumferential wall between said first and second compartments extending inward a short radial distance to provide access for inserting said spool into said second compartment from said first compartment and providing sufficient surface to rotatably support said spool within said second compartment when dropped to the floor thereof.

9. A storage device as in claim 1, wherein said multi-compartment chamber is constructed and arranged to float in water with its hollow third compartment tilted upward in a forward axial direction to maintain said access opening above water level.

10. A storage device for use as a hand caster for fishing comprising a multi-compartment housing of essentially cylindrical configuration having a first compartment constructed and arranged to store emergency supplies or tackle at a rear end portion of said housing, a second compartment constructed and arranged to store within said second compartment a spool with a stored portion of fishing line wound therearound, said second compartment being located axially forward of said first compartment, a short circumferential divider wall separating an axially front end of said first compartment and an axially rear end of said second compartment, said divider wall being constructed and arranged to provide an intermediate opening to receive said spool therethrough from said first compartment when said first compartment is empty and to provide sufficient surface to rotatably support said spool within said second compartment when dropped to the floor thereof, a hollow storage chamber radially outward from said first compartment and a radially upward extending thin connecting means interconnecting said first compartment and said hollow storage chamber and arranged to cooperated with said hollow storage chamber to form a handle offset radially outward and axially rearward of said second compartment wherein said second compartment has a continuous forward wall and an access opening in a roof portion of an outer circumferential wall of said second compartment that faces said hollow storage chamber to receive an exterior portion of said fishing line extending from said stored portion wound around said spool.

11. A storage device as in claim 10, further including a transparent wall for said hollow storage chamber.

12. A storage device as in claim 10, wherein said multi-compartment housing has an enlarged wall portion axially forward of said spool when the latter is stored in said second compartment and said thin connecting means has a convexly curved axially forward radially inner portion spaced axially rearward of said spool when said spool is stored in said second compartment to provide a circumferential recess around said second compartment constructed and arranged to receive an exterior portion of said fishing line for winding around said circumferential recess.

13. A storage device as in claim 12, wherein said access opening is constructed and arranged to allow said exterior portion of said fishing line to be unwound from said circumferential recess when said hand caster is actuated without releasing said stored portion of said fishing line from said spool within said second chamber yet permits an additional length of said stored portion to be pulled from said stored portion nd wound around said circumferential recess by hand when said exterior portion of said fishing line needs replacement.

14. A storage device as in claim 12, further including a third compartment axially forward of said second compartment that is hollow to improve the buoyancy of said multi-compartment housing.

15. A storage device as in claim 14, constructed and arranged to float on water with said access opening above the water line of said hand caster.

16. A storage device as in claim 15, constructed and arranged so that said multiple chamber housing floats in water with its front end wall titled upward to ensure that said access opening and said transparent wall are above water level when said housing has supplies loaded within said first compartment, and a flashlight stored in said hollow storage chamber.

17. A storage device as in claim 15, wherein said housing has a front end wall and a rear end wall, at least one of said end walls having a light reflection portion.

* * * * *